May 4, 1954
F. F. HANSEN
2,677,334
PRESSURE BOARD
Filed April 7, 1952
2 Sheets-Sheet 2
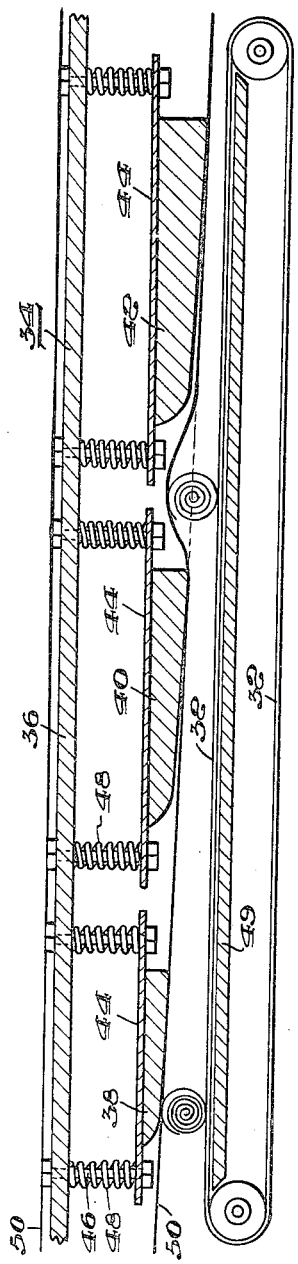
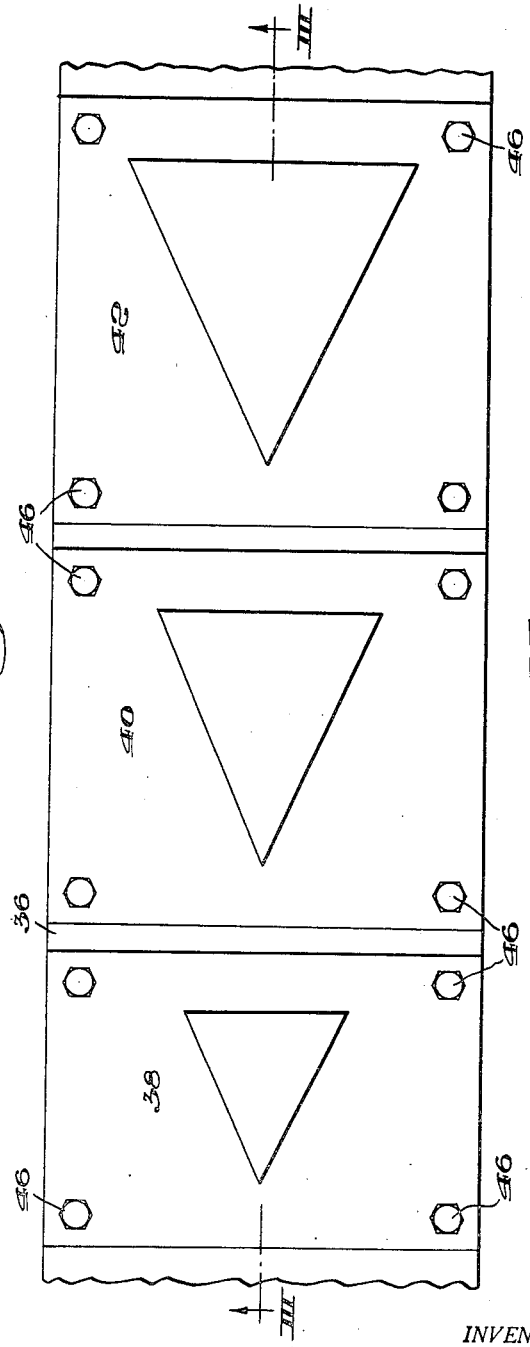
INVENTOR.
FRANCIS FREDERICK HANSEN
BY
Christy, Parmelee and Strickland
his
ATTORNEYS Patented May 4, 1954

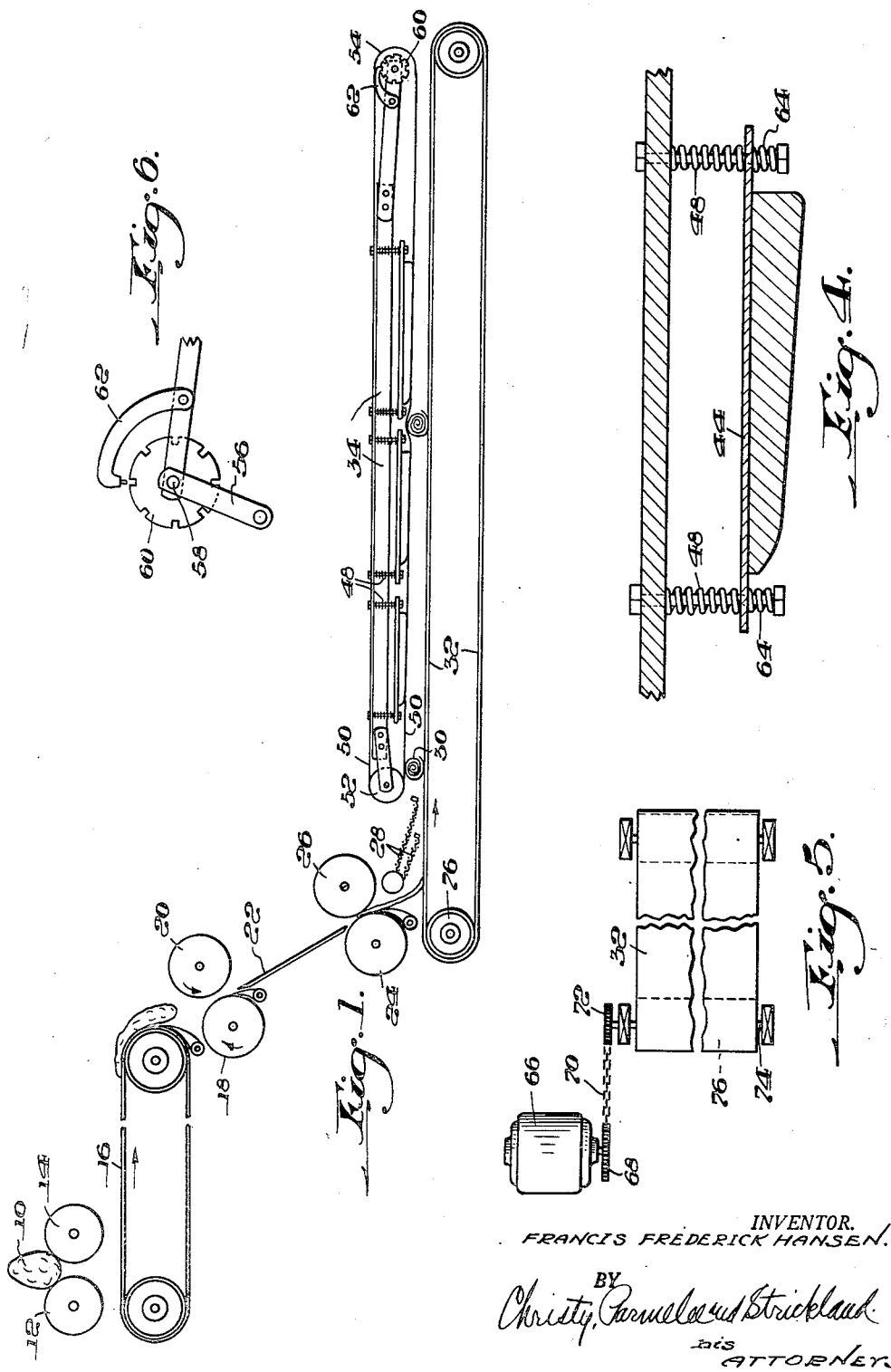

2,677,334

UNITED STATES PATENT OFFICE 2,677,334

PRESSURE BOARD

Francis Frederick Hansen, Pittsburgh, Pa.

Application April 7, 1952, Serial No. 280,891

9 Claims. (Cl. 107—9)

This invention relates to pressure or rolling boards. More particularly, the invention relates to pressure boards for dough loaf moulding machines to knead loaves of bread preparatory to panning the loaves.

In one type of loaf dough moulding machine now being used, partially raised yeast dough which is cut in weighed lumps from a large batch is sheeted and rolled into loaves before being panned. After the dough has been sheeted into a thin sheet, the sheet is rolled into a roll and then passed under a pressure board to unite and eliminate the division lines which are formed from the walls of the sheet, and to lengthen the roll before panning.

In the present moulding machines, the sheeting rolls do all of the degasing of the dough and the formation of the grain structure. The pressure board merely acts to roll a thin sheeted sheet into a roll of desired length. I have found that the rolling board may be effectively used for driving air out of the roll which is trapped when making the roll, and to improve the grain structure and to eliminate lines which are formed by the walls of the thin sheets when the sheet is first formed into a roll. Any air trapped in a roll that is baked will make holes in the baked loaf of bread.

The primary object of the present invention is to provide a pressure board for a dough moulding machine by which the dough, when in the form of a roll, may be kneaded and elongated to eliminate the sheet dividing lines and remove air from between the layer of the roll.

Another object of the invention is to provide a pressure board for a dough moulding machine by which the rolling and compression action may be varied to control the length of the load being made.

A further object of the invention is to provide a pressure board for a dough moulding machine by which a roll of dough may be subjected alternately to compression and expansion while kneading and elongating the dough loaf preparatory for panning.

With these and other objects in view, the invention consists in the improved dough pressure board for a moulding machine as hereinafter illustrated, described and particularly defined in the appended claims. The various features of the invention are illustrated in the accompanying drawings, in which:

Fig. 1 is a diagrammatic illustration of the presheeting rolls, the sheeting rolls, the sheet curling device and the pressure board of a bread dough moulding machine embodying the present invention;

Fig. 2 is a bottom plan view of the pressure board shown in Fig. 1;

Fig. 3 is a vertical sectional view of the pressure board taken on the line III—III of Fig. 2;

Fig. 4 is a vertical sectional view of a modified form of one section of a pressure board embodied in the present invention;

Fig. 5 is a diagrammatic plan view showing the drive for the pressure board belt; and Fig. 6 is a detailed view showing a device for moving and holding the upper pressure board belt.

In Fig. 1 is illustrated the embodiment of a pressure board of the present invention in the type of dough moulding machine which involves the use of presheeting rolls and first and second sets of sheeting rolls. After the dough sheet leaves the second set of sheeting rolls, it is curled into a roll and carried by a belt under the pressure board. The lump of dough 10 to form a loaf of bread passes between presheeting rolls 12 and 14 and is received on a belt 16 to be carried to the first set of sheeting rolls 18 and 20. The dough passing through the sheeting rolls 18 and 20 is kneaded, extruded and compressed into a comparatively thin sheet, and passes over a transfer plate 22 to the second set of sheeting rolls 24 and 26. In passing between the second set of sheeting rolls, the dough sheet is further elongated and made thinner and passes under curling screens 28 where it is rolled into a roll 30. The dough emerging from the rolls 24 and 26 is received on a rolling belt 32 which carries it under the curlers 28 and improved pressure board 34. After the dough roll 30 is carried under the pressure board, it is discharged from the end of the belt 32 into panning equipment (not shown).

The pressure board 34 and its driving belt 32 are illustrated in detail in Figs. 2 and 3. The board 34 consists of an elongated flat board 36 which is supported above the belt and has a series of rolling sections 38, 40 and 42 yieldingly attached to the bottom side thereof. In Fig. 2 is illustrated a bottom plan view of the board 36 and the sections 38, 40 and 42 in the relation of their size for preparing a roll of dough for the panning operation. Each of the rolling sections 38, 40 and 42 are substantially V-shaped with the small or pointed end of the V positioned in line to contact the dough roll as it enters under the board. Each section acts to compress, extrude and roll the dough loaf to elongate it. After the roll leaves one section, the dough expands and elongates due to its elasticity, and is then delivered to the next section. Therefore, the dough roll as it is rolled by the board 34 is subjected to an alternate compression and expansion operation which acts to deair the dough and at the same time eliminate the division lines which are formed at the center of the roll and drive the air out of the ends of the roll.

Each of the rolling sections 38, 40 and 42 are attached to a board 44 by means of bolts 46 which are arranged adjacent each corner of the boards 44. Between the board 36 and the boards 44 are mounted compression springs 48 which allow the sections to yield and move upwardly toward the board 36 as the dough rolls thereunder. A stiff supporting board 49 is positioned under the belt 32 to support the belt and roll so that the roll may be compressed by the spring pressed sections 38, 40 and 42. With the alternate compression and expansion, the dough roll is gradually elongated and is worked to improve the dough grain structure and texture and reduce the roll to a uniform diameter throughout its length.

To better control the movement of the dough rolling under the pressure board, a canvas belt 50 (Figs. 1 and 2) is mounted to surround the board 36. The belt 50 is a continuous belt and runs between rolls 52 and 54 which are journaled at opposite ends of the board 36. A handle 56 is fixed on the axle 58 of the roll 54 by which the belt may be moved by hand to shift its position under the board. A stop wheel 60, movable with the roll 54 and latch 62 (Fig. 6) cooperating with the wheel 60 are provided at the end of the board in order to lock the belt in any desired position. By means of the handle 56, the belt may be moved longitudinally of the board to bring that portion of the belt which has been in contact with the dough rolls to the upper portion of the board to allow it to be cleaned and prepared to again be moved down under the board for contact with the dough rolls. In the normal operation of the board, the belt is held in stationary position by the latch 62. As illustrated in Fig. 3, the expansive and elastic nature of the dough allows it to elongate and to increase in diameter as it moves from one section of the rolling board to the next, the dough being compressed by each section of the board as it advances.

In the operation of the dough moulding machine, the individual loaves of dough are sent through the machine so that not more than one dough roll is under each section of the pressure board at one time. In this way each roll of dough is given the desired compression, rolling and extrusion treatment and the treatment is not altered by another roll which might also be under a rolling section. The length and the spacing of the rolling sections is such that the moulding machine may be operated at a comparatively high rate and still confine one dough roll to a rolling section at a time.

As seen more particularly in Fig. 3, each of the sections 38, 40 and 42 is thinner at its leading edge than at its rear edge in order to effect compression of the dough. And the rear edge of one section is thicker than the leading edge of the following section. This construction also acts to cause the dough roll to expand under elasticity and contract under compression as it advances from one section to the next.

In Fig. 4 is illustrated a modified form of the dough rolling sections in which the board 44 is mounted between compression springs 48 and springs 64. This allows the rolling sections to move both upwardly and downwardly in pressing the dough, and is very effective in making the dough loaf uniform in composition while eliminating the division lines which are formed when the sheet is rolled. This rocking action of the rolling sections also is effective in deairing the dough and in improving the grain structure of the loaf.

In Fig. 5 is illustrated a driving mechanism by which the rolls and the belts may be operated. The driving operation is accomplished by means of a motor 66 which has a sprocket 68 by which it is connected with a sprocket chain 70 to a sprocket 72 attached to the axle 74 of a roll 76, by which the belt 32 is driven. All of the sheeting rolls and belt driving rolls may be operated through sprockets and chains with one motor, or separate motors may be used for driving two or more sets of rolls. It is important in operating the sheeting rolls that the rate of speed of the rolls may be adjusted so that the sheet of dough will travel from one set of sheeting rolls to the next set of sheeting rolls without being wrinkled or puckered.

The rolling faces of the pressure board sections 38, 40 and 42 will vary for making bread loaves of different sizes and lengths. For example, the rear end of the V-shaped section 38 may vary in length from four to six inches, while the rear end of the section 42 may vary from eight to fourteen inches, and the rear end of the section 40 may vary from six to ten inches. The lengths of the sections 38, 40 and 42 may vary from six to ten, eight to fourteen, and ten to eighteen inches respectively.

The sheeting rolls 18 and 20 and 24 and 26 may have different diameters to be operated at different lineal rates of speed for sheeting the dough loaf, such as illustrated and described in my application Serial No. 261,288, filed December 12, 1951.

The preferred form of the invention having been thus described, what is claimed as new is:

1. A pressure board for a bread dough moulding machine comprising a fixed supporting structure, a movably mounted belt positioned below the structure, means to drive the belt to roll bread dough rolls under the structure, and a series of separately movable flat surface triangularly-shaped rolling sections arranged in tandem and attached to the structure with yieldable compression springs between the structure and each section, the surface of said sections being spaced from the belt to form a pressure rolling surface for dough rolls carried thereunder by the belt.

2. The pressure board defined in claim 1 in which a stationary belt is positioned in engagement with the bottom of the sections whereby the dough rolls are advanced between the upper stationary belt and the driven belt.

3. The pressure board defined in claim 2 in which the upper belt is normally held in stationary position, and means are provided to move the belt longitudinally of the sections to arrange the belt surface for cleaning.

4. The pressure board defined in claim 2 in which the yieldable sections are spaced apart a distance greater than the diameter of a dough roll so that a dough roll is carried forward by being held between the two belts as it advances from one section to the next section.

5. The pressure board defined in claim 2 in which the stationary belt has slack therein to permit expansion action of the dough as it advances between the rolling sections.

6. The pressure board defined in claim 1 in which the dough engaging surface of the sections are substantially V-shaped with the point of the V arranged to first engage the dough roll.

7. The pressure board defined in claim 6 in which the rear ends of the V-shaped sections are progressively wider in the direction of advance of the dough roll.

8. The pressure board defined in claim 6 in which the sections are gradually thickened from the front toward the rear end of the sections to increase the pressure on the dough roll as it advances under each section.

9. The pressure board defined in claim 8 in which the pointed end of one V section is spaced farther from the rolling belt than the back end of the preceding section.

References Cited in the file of this patent

UNITED STATES PATENTS

| Number | Name | Date |
|---|---|---|
| 889,465 | Keller et al. | June 2, 1908 |
| 1,582,382 | Collis | Apr. 27, 1926 |
| 1,796,922 | Eseman | Mar. 17, 1931 |

FOREIGN PATENTS

| Number | Country | Date |
|---|---|---|
| 183,848 | Great Britain | July 26, 1923 |